(12) United States Patent
Bappe

(10) Patent No.: US 9,092,143 B1
(45) Date of Patent: Jul. 28, 2015

(54) DYNAMIC ASSIGNMENT OF TIME INTERVAL BINS

(75) Inventor: Michael E. Bappe, Loveland, CO (US)

(73) Assignee: EMC Corporation, Hopkinton, MA (US)

( * ) Notice: Subject to any disclaimer, the term of this patent is extended or adjusted under 35 U.S.C. 154(b) by 483 days.

(21) Appl. No.: 13/531,847

(22) Filed: Jun. 25, 2012

(51) Int. Cl.
  *G06F 1/14* (2006.01)
  *G06F 1/04* (2006.01)
  *G06F 3/06* (2006.01)
  *G06F 11/34* (2006.01)

(52) U.S. Cl.
  CPC .............. *G06F 3/061* (2013.01); *G06F 3/0611* (2013.01); *G06F 11/3485* (2013.01)

(58) Field of Classification Search
  CPC .... G06F 3/061; G06F 3/0611; G06F 11/3485
  USPC ........................................................ 713/502
  See application file for complete search history.

(56) References Cited

U.S. PATENT DOCUMENTS

| | | | |
|---|---|---|---|
| 5,307,350 A * | 4/1994 | McIntyre | 370/447 |
| 6,718,479 B1 * | 4/2004 | Christenson | 713/502 |
| 2004/0059545 A1 * | 3/2004 | Sun | 702/186 |
| 2007/0008947 A1 * | 1/2007 | Belcea | 370/350 |
| 2010/0017634 A1 * | 1/2010 | Chen | 713/322 |
| 2010/0097960 A1 * | 4/2010 | Amano | 370/260 |

OTHER PUBLICATIONS

EMC Corporation, "EMC Powerpath Load Balancing and Failover Comparison with Native MPIO Operating System Solutions," (http://www.emc.com/collateral/software/white-papers/h8180-powerpath-load-balancing-failover-wp.pdf) Feb. 2011.
Storage Networking Industry Association "Multipath Management API," Version 1.1, SNIA Technical Position, (http://www.snia.org/sites/default/files/MMA_Technical_Position_v1.1.pdf) Mar. 8, 2010.
Gaikwad, et al., "Aquisition and Kernel Memory Storage of I/O Metrics" U.S. Appl. No. 13/341,348, filed Dec. 30, 2011.
Bappe, et al., "Detecting Bogus IOS in a Multipathing Driver" U.S. Appl. No. 13/627,594, filed Sep. 26, 2012.

* cited by examiner

*Primary Examiner* — Jaweed A Abbaszadeh
*Assistant Examiner* — Xuxing Chen
(74) *Attorney, Agent, or Firm* — BainwoodHuang

(57) ABSTRACT

An improved technique for measuring I/O latency in an I/O driver of a host computing system includes obtaining the tick size of a high resolution clock of the host and setting the boundaries of I/O latency buckets at different calculated numbers of high resolution clock ticks. The I/O latency buckets are used for binning latency measurements made by the I/O driver. The boundaries of the I/O latency buckets are expressed as numbers of high resolution clock ticks and correspond to a sequence of predetermined time values. At runtime, the I/O driver measures the latency of I/O requests using timestamps obtained from the high resolution clock. The latency measurements are expressed as numbers of elapsed ticks. The I/O driver then assigns measured latency values to data buckets by comparing ticks to ticks, without the need for unit conversion or resource-intensive arithmetic.

20 Claims, 5 Drawing Sheets

DYNAMIC ASSIGNMENT OF TIME INTERVAL BINS

BACKGROUND

Conventional I/O drivers run on host computers ("hosts") connected to disk arrays and process I/O requests originating from user application programs running on the hosts. I/O requests include directions to read data from and write data to the disk arrays connected to the hosts.

I/O drivers can perform many functions. As part of processing I/O requests, certain I/O drivers perform multipathing (i.e., connecting to arrays through multiple paths to provide load balancing and failover), provide encryption of data, and assist with data migration. An example of an I/O driver of this type is the PowerPath® driver from EMC Corporation of Hopkinton, Mass.

As I/O drivers process I/O requests, the I/O drivers may collect performance data relating to the I/O requests. For example, I/O drivers may count the number of I/O requests received. Such performance data are typically stored in the I/O driver and can be extracted by a client program running on the host, or on a different host, to monitor performance.

SUMMARY

Efforts have recently been undertaken to enlarge the scope of performance data collected by I/O drivers. For example, in addition to counting the number of I/O requests received, an I/O driver may also keep track of latencies involved in processing I/O requests.

Typically, an I/O driver measures the latency of an I/O request by obtaining two timestamps at two different times in the course of the processing of the I/O request. For example, the I/O driver may obtain a first timestamp when the driver dispatches the I/O request to the array and may obtain a second timestamp when the I/O driver receives a response to the I/O request from the array. The I/O driver can then subtract the first timestamp from the second timestamp to compute the elapsed time, or latency, involved in processing the I/O request.

I/O drivers typically run in the kernel of their hosts' operating systems, where resources are scarce. Rather than storing measured latency values as numbers, which can consume valuable kernel space, I/O drivers may instead use a binning process to count latency values in different data buckets. Multiple data buckets may be established to cover contiguous ranges of latency. For instance, a first data bucket may cover a latency range between 0 and 1 millisecond, a second data bucket may cover a latency range between 1 and 10 milliseconds, and so on. Each data bucket is provided with a counter, and the counter is incremented each time a latency value for an I/O request is measured that falls within the range of the bucket. By storing latency values as bucket counts rather than as fixed or floating point numbers, the I/O driver provides a rich set of performance data while still conserving kernel memory.

Unfortunately, the timestamps used to mark time for computing latency measurements in I/O drivers are often too coarse to provide useful results. Standard clocks of most operating systems typically have resolutions in the millisecond range. Although standard clocks may be useful in measuring very long I/O latencies, they do not provide the granularity needed for measuring shorter I/O latencies. Indeed, many I/O requests will be processed to completion before a single tick of a standard clock elapses, causing all such I/O requests to be assigned to the same latency bucket. A great deal of performance data pertaining to driver latency is therefore never recorded with any meaningful degree of resolution.

It has been recognized, however, that many operating systems include a high resolution clock, with some clocks extending into the gigahertz range. The tick size of such clocks (i.e., the time interval between successive ticks) typically varies from operating system to operating system, and from host to host.

In contrast with the prior approach, where latency measurements have been made using standard, low resolution clocks, an improved technique for measuring I/O latency in an I/O driver of a host computing system includes obtaining the tick size of a high resolution clock of the host and setting the boundaries of I/O latency buckets at different calculated numbers of high resolution clock ticks. The I/O latency buckets are used for binning latency measurements made by the I/O driver. The boundaries of the I/O latency buckets are expressed as numbers of high resolution clock ticks and correspond to a sequence of predetermined time values. At runtime, the I/O driver measures the latency of I/O requests using timestamps obtained from the high resolution clock. The latency measurements are expressed as numbers of elapsed ticks. The I/O driver then assigns measured latency values to data buckets by comparing ticks to ticks, without the need for unit conversion or resource-intensive arithmetic. The improved technique thus addresses the need for higher resolution in measuring I/O request latency. In doing so, the improved technique also addresses the variability of encountering different clocks on different systems, as well as the need for maintaining computational efficiency within the kernel.

Certain embodiments are directed to a method operable by an I/O driver of a host computing system. The method includes providing a sequence of time-referenced boundaries for binning time interval measurements made by the I/O driver. The method further includes querying an operating system of the host computing system to obtain a tick size of a clock of the host computing system, the tick size indicating the duration between successive ticks of the clock. For each of the sequence of time-referenced boundaries, the method further includes calculating a number of ticks of the clock that fit into the time-referenced boundary, so as to produce a sequence of tick-referenced boundaries each expressed as a number of ticks of the clock. Each consecutive pair of tick-referenced boundaries forms a data bucket having a range extending from a lower boundary to an upper boundary of the pair of tick-referenced boundaries.

Other embodiments are directed to computerized apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for measuring I/O latency in an I/O driver of a host computing system includes obtaining the tick size of a high resolution clock of the host and setting the boundaries of I/O latency buckets at different calculated numbers of high resolution clock ticks. At runtime, the I/O driver measures the latency of I/O requests using timestamps obtained from the high resolution clock. The I/O driver then assigns measured latency values to data buckets by comparing ticks to ticks, without the need for unit conversion or resource-intensive arithmetic.

Figure 1:
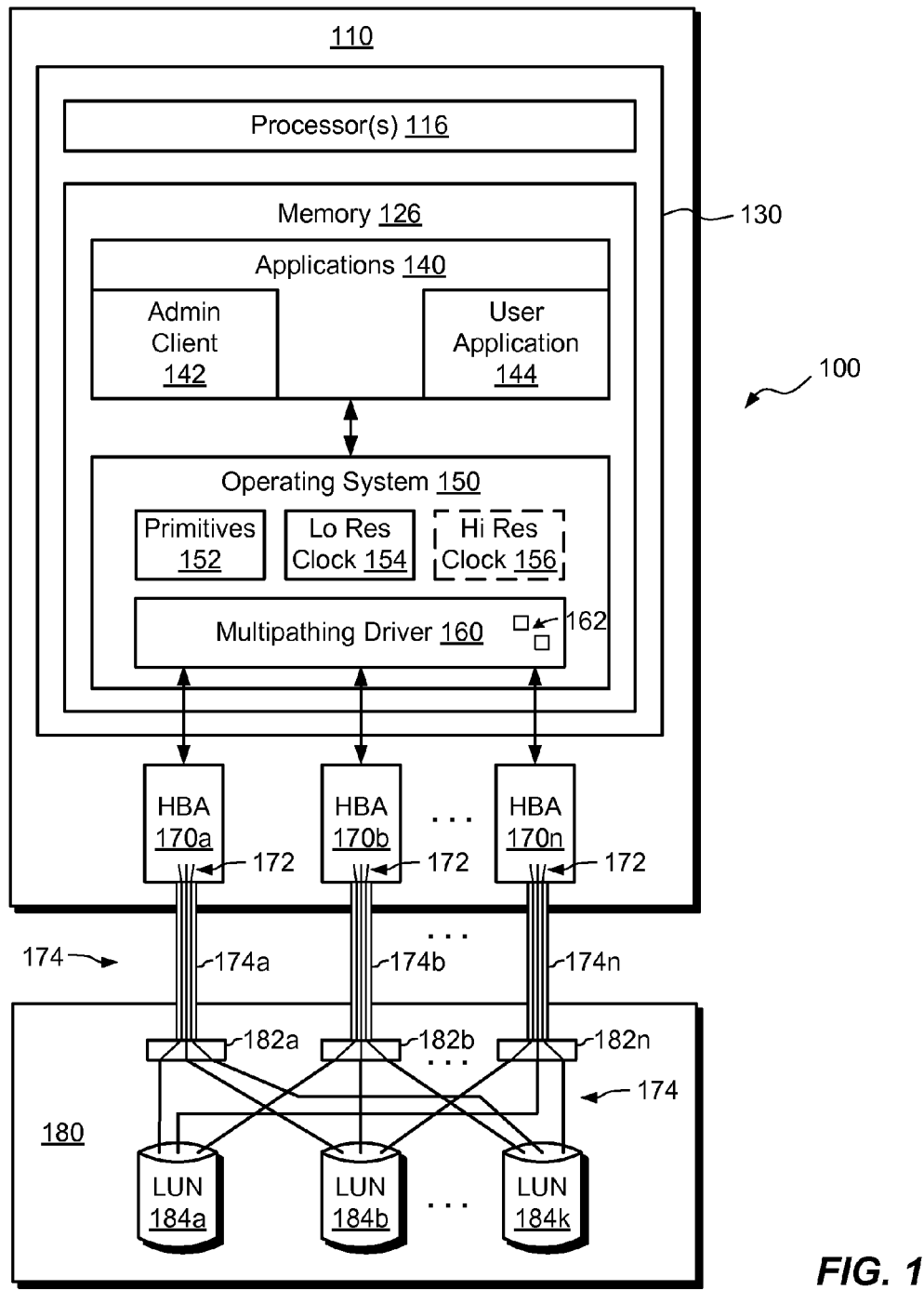
FIG. 1 is a block diagram of a example electronic system including a host computing machine and a storage array, where the host computing machine is configured to dynamically establish boundaries of I/O latency buckets.

FIG. 1 shows and example electronic environment 100 in which high resolution measurements of I/O request latency can be made. The environment 100 includes a host computing system 110 coupled to a storage array 180 through a medium 174. The array 180 includes multiple logical units, or "LUNs" 184a-k." Each of the LUNs 184a-k typically includes one or more disk drives, non-volatile solid state memory, and/or a combination of disk drives and solid state memory.

The host computing machine 110 (i.e., the "host") includes a set of processors 116 (e.g., one or more processing chips and/or assemblies), memory 120, and a set of host bus adapters 170a-170n. The host 110 may also include one or more interfaces (not shown), such as a network interface and/or a user interface, for communicating with users and other computing devices. The set of processors 116 and the memory 120 together form a specialized circuit 130, which is constructed and arranged to carry out various processes conducted by the host 110.

The memory 120 stores code for applications 140 and an operating system 150. The applications include an administrative client 142 and a user application 144, for example. The operating system 150 may include primitives 152, a standard, low resolution clock 154, and an I/O driver, such as a multipathing driver 160. A high resolution clock 156 may also be present on some systems. The multipathing driver 160 may be provided as a kernel extension of the operating system 150. The multipathing driver 160 includes data buckets 162 for storing counts of latency measurements made by the multipathing driver 160. Boundaries defining the data buckets 162 may be dynamically established based on the tick size of the low resolution clock 154 or the high resolution clock 156. It is understood that the memory 120 may include a myriad of constructs besides those shown; however, such constructs are omitted from FIG. 1 for the sake of simplicity.

In some examples, the host bus adapters 170a-n are SCSI initiators and the array 180 includes SCSI targets 182a-n. SCSI Initiator-Targets (I-T's) 174a-n are provided within the medium 174 to connect the host bus adapters 170a-n to respective SCSI targets 182a-n. The I-T's 174a-n are also referred to herein as "buses."

Also shown in FIG. 1 are a number of SCSI I-T-L's (Initiator-Target-LUNs), which are referred to herein as "paths" 172. In this example, a total of nine paths 172 are shown. Each of the paths 172 extends from one of the host bus adapters 170a-n, through a respective one of the buses 174a-n, to a respective one of the targets 182a-n, and to a respective one of the LUNs 184a-k. Providing different paths 172 to each respective LUN 184a-k of the array 180 affords the electronic environment 100 with redundancy, load balancing, and failover.

Although the host 110 is typically a server level computer, this is not required. The host 110 may be any type of computer or computing device. Also, while the applications 140 are typically of a type that are accessible to users via a graphical user interface (GUI) or command line interface (CLI), it is understood that the applications 130, or a subset of the applications 130, can be run independently of user interaction or in the background. For example, the applications 140 can be run as daemons, processes, or other software constructs. In some examples, the administrative client 142 is run off-host, i.e., on a computing machine other than the host 110, which is connected to the host 110 via a computer network. A variety of operating systems can be run on the host 110, with non-limiting examples including Microsoft Windows™, Unix, Red Hat Linux, or vSphere® from VMware®, for example.

In operation, the host 110 executes the user application 144. The user application 144 typically includes high level instructions for writing to and/or reading from the array 180. The host 110 translates these high level instructions into I/O requests, which are passed along an I/O stack of the host 110 to the multipathing driver 160. The multipathing driver 160 processes the I/O requests and forwards the I/O requests along the I/O stack, e.g., to HBAs 170a-n. The I/O requests are then sent via designated paths 172 to designated LUNs 184a-k on the array 180. Responses to I/O requests, such as data for READs and acknowledgements for WRITEs, are returned from the array 180 to the multipathing driver 160.

As the multipathing driver 160 processes I/O requests, the multipathing driver 160 may collect performance data, such as latencies of READs and WRITEs. The multipathing driver 160 stores the performance data in the data buckets 162. For instance, rather than storing values of I/O latency as individual numbers, which can consume valuable kernel space, counters associated with the data buckets 162 are instead incremented. The data buckets 162 cover contiguous ranges of values of I/O latency. The ranges may be arranged linearly or logarithmically, for example. When an I/O request is processed, a counter is incremented for the bucket that covers the range of I/O latency that includes that of the received I/O request. Considerable space is conserved, as each value of I/O latency can be recorded simply as a count in a data bucket. A technique of this kind for collecting performance metrics using data buckets is described in U.S. patent application Ser. No. 13/341,348, filed Dec. 30, 2011, and entitled "AQUISITION AND KERNEL MEMORY STORAGE OF I/O METRICS," which is incorporated by reference in its entirety.

Data buckets 162 are defined by a sequence of boundaries, which may be established dynamically. For example, during startup or at some other setup phase, the multipathing driver 160 accesses the primitives 152 to query the operating system 150 for the existence of a high resolution clock (i.e., the clock 156). If the operating system 150 reports that a high resolution clock 156 is present, the driver 160 obtains (via the primitives 152) the tick size of the high resolution clock 156. In some examples, the boundaries of the data buckets 162 are set in advance at fixed time intervals. For example, a first data bucket may cover a range from 0 to 1 nanosecond, a second bucket may cover a range between 1 and 3.2 nanoseconds, and so forth. The multipathing driver 160 converts this sequence of time-referenced boundaries into a corresponding sequence of tick-referenced boundaries. With bucket boundaries set to numbers of ticks of the high resolution clock 156, binning of latency values at runtime is simplified and may be conducted at high speed with little impact on the efficiency of the multipathing driver 160.

Not all hosts 110 will necessary have a suitable high resolution clock 156. In such hosts 110, the low resolution clock 154 may be used. The boundaries of the data buckets 162 are then set according to a predetermined sequence, where the upper boundary of the smallest data bucket corresponds to one tick of the low resolution clock. Successive bucket boundaries increase in some fixed pattern of low-resolution clock ticks. In one example, boundaries for binning latency values with the low resolution clock 154 follow a pattern where the number of ticks increase in powers of 2 (e.g., 2, 4, 8, 16, and so forth). The boundaries for the low resolution clock 154 are thus set at fixed numbers of low resolution clock ticks, irrespective of the times to which the boundaries correspond. This arrangement stands in contrast with boundaries set for use with the high resolution clock 156, which are aligned with predetermined time intervals.

Figure 2:
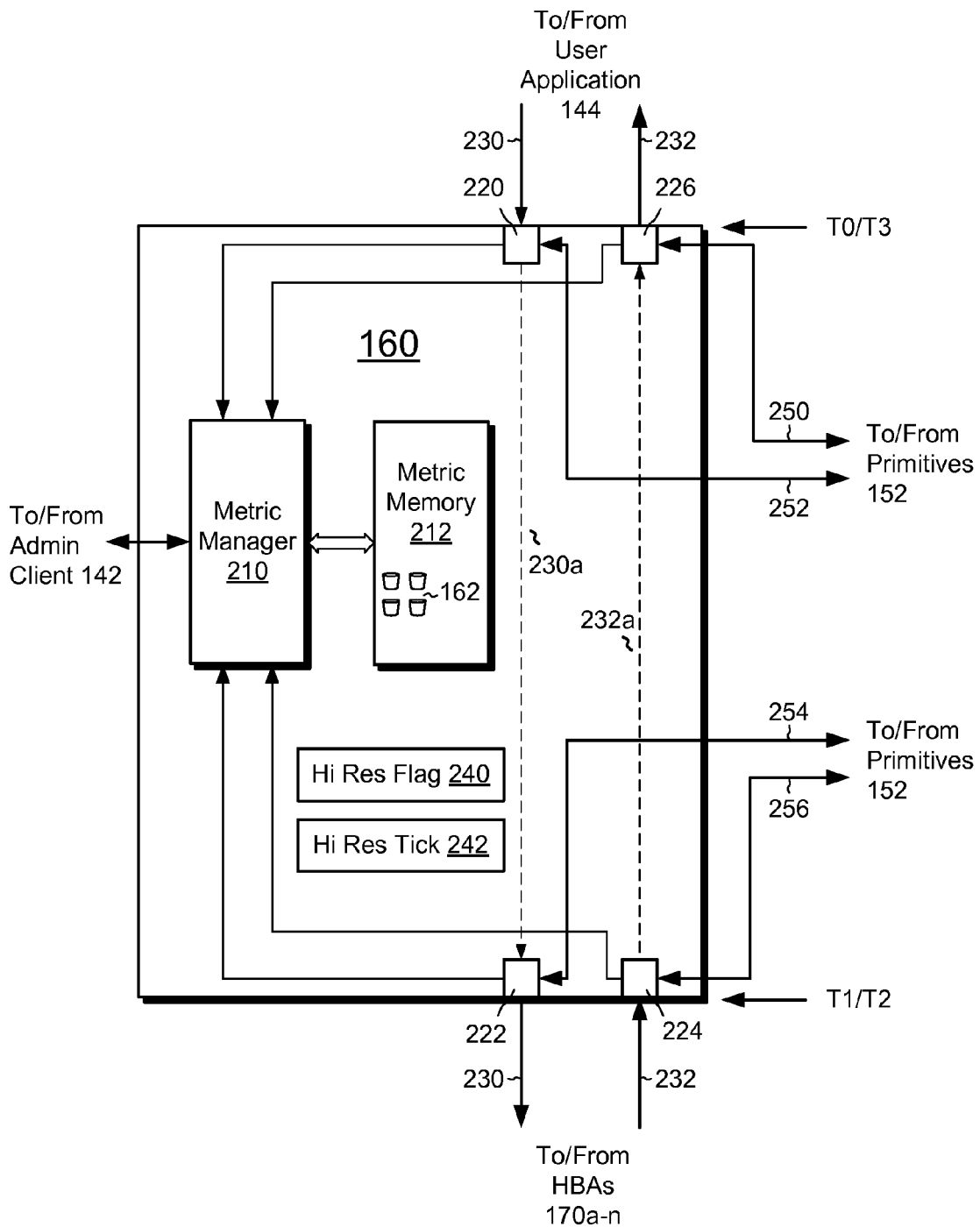
FIG. 2 is a block diagram of an example I/O driver of FIG. 1.

FIG. 2 shows an example multipathing driver 160 of FIG. 1 in greater detail. Here, it is seen that the multipathing driver 160 includes a metric manager 210, a metric memory 212, and I/O monitors 220, 222, 224, and 226. The metric memory 212 includes the data buckets 162. The multipathing driver 160 stores a high resolution clock flag 240, to indicate whether the host 110 includes a high resolution clock 156, and a high resolution tick size indicator 242, to store the time interval between successive ticks of the high resolution clock 156, assuming one is present.

During startup or some other configuration phase, the metric manager 210 checks whether the host 110 includes a high resolution clock 156. For example, the metric manager 210 may call one of the primitives 152 to enquire about the clock status from the operating system 150. A result is returned and stored in the high resolution clock flag 240. In an example, the flag 240 is true if the host 110 includes a high resolution clock 156 and is false otherwise. If the host 110 includes a high resolution clock 156, the metric manager 21 queries the operating system 150 (e.g., via another primitive call) to obtain the tick size of the high resolution clock 156. The tick size may then be stored in the high resolution tick size indicator 242.

The metric manager 210 then sets the boundaries of the data buckets 162 of the metric memory 212 based on the obtained tick size. When the high resolution clock flag 240 is true, the metric manager 210 computes a sequence of numbers of high resolution clock ticks that fit into a predetermined sequence of time-referenced boundaries. In an example, the time-referenced boundaries are set at different numbers of nanoseconds, where the numbers increase as powers of the square root of 10. For each boundary, a number of ticks is calculated, so that a sequence of numbers is produced that correspond to the sequence of time-referenced boundaries. The numbers of high resolution clock ticks are then stored as tick-referenced boundaries in the metric memory 212, to be used at runtime for binning latency measurements.

When the high resolution clock flag 240 is false, the metric manager 210 instead establishes boundaries for the data buckets 162 as integer numbers of low resolution clock ticks, where the data bucket covering the smallest range of latency values covers the range between 0 and 1. In an example, data bucket boundaries increase as powers of two. Thus, for example, data buckets 162 for use with a low resolution clock 154 have boundary values at 1, 2, 4, 8, and so forth, regardless of the specific tick size of the low-resolution clock 154. Although the low resolution tick size may be obtained by the driver 160 and reported to the administrative client 142, it typically has no bearing on the establishment of bucket boundaries.

At runtime, I/O requests are generated by the user application 144. The I/O requests propagate through an I/O stack of the host 110 and reach the multipathing driver 160 as I/O requests 230. The I/O monitor 220 detects the arrival of the I/O request 230 and requests a first timestamp, T0. For example, the I/O monitor 220 issues a call 252 to one of the primitives 152 provided for accessing a system clock (either the high resolution clock 156 or the low resolution clock 154, depending on the high resolution clock flag 240). The timestamp T0 is then provided to the metric manager 210, which may store the timestamp T0 in connection with an identifier of the I/O request 230.

The I/O request 230 then propagates through the multipathing driver 160, along the path 230a, until processing of the I/O request 230 by the multipathing driver 160 is complete, at which point the I/O request reaches the I/O monitor 222. The I/O monitor 222 detects the arrival of the I/O request 230 and requests a timestamp T1. For example, the I/O monitor 222 issues a call 254 to one of the primitives 152 as before. The timestamp T1 is returned and stored in the metric memory 210. The I/O request 230 then propagates to subsequent layers of the I/O stack of the host 110, e.g., to one of the host bus adapters 170a-n, and, eventually, to the array 180.

The array 180 processes the I/O request 230 and returns a response 232. For example, if the I/O request 230 is a READ, the response 232 may include the requested data (or an indication that the requested data has arrived in a local cache). If the I/O request 230 is a WRITE, the response 232 may include an acknowledgement. When the response 232 reaches the multipathing driver 160, the I/O monitor 224 detects the arrival of the response 232 and requests a timestamp T2 (e.g., via a call 256 to one of the primitives 152). The timestamp T2 is then stored in the metric manager 210.

The response 232 then propagates through the multipathing driver 160, along path 232a, until processing of the response 232 by the driver 160 is complete. The I/O monitor 226 then detects the response 232 and requests a timestamp T3 (e.g., via a primitive call 250). The timestamp T3 is then stored in the metric manager 210.

The timestamps T0, T1, T2, and T3 are either all obtained from the high resolution clock 156 or all obtained from the low resolution clock 154, depending on the value of the high resolution clock flag 240. If the flag 240 is true, the timestamps T0, T1, T2, and T3 are obtained from the high resolution clock 156. If the flag 240 is false, the timestamps T0, T1, T2, and T3 are obtained from the low resolution clock 154. In either case, the timestamps T0, T1, T2, and T3 are expressed in terms of numbers of clock ticks.

In an example, the clocks 154 and 156 are provided in the form of counters incremented by one or more oscillators (e.g., crystal oscillators) provided on the host 110. Each of the timestamps T0, T1, T2, and T3 thus represents a current integer value of a regularly incrementing counter.

The metric manager 210 applies the timestamps T0, T1, T2, and T3 to calculate I/O request latency. Various latency measurements can be made. For example, the metric manager 210 may calculate a forward latency through the driver 160 as T1-T0. The metric manager 210 may calculate a reverse latency through the driver 160 as T3-T2. Similarly, the metric manager 210 may calculate an external latency (e.g., to the array 180 and back) as T2-T1, and may calculate a total round trip latency, including driver delays, as T3-T0. In an example, each computed value of latency is an integer (e.g., the difference between two integer clock counter values).

The metric manager 210 then assigns each of these driver latencies, some subset of them, or other latencies, to the data buckets 162 in the metric memory 212, using the bucket boundaries computed at startup. It is understood that different sets of latency buckets may be provided for different types of latency measurements. For example, one set may be provided for T1-T0 latency, another set may be provided for T2-T1 latency, and so forth. To assign latency values to buckets, the metric manager 210 needs only to find the bucket that contains the range of integers that includes the integer latency value and increment the counter of the identified bucket. No complex mathematics, such as multiplies or divides, are required. Rather, binning can be accomplished simply by comparing integers to integers. In an example, the metric manager 210 identifies a matching bucket for each latency value by applying a binary search algorithm.

Values of the data buckets 162 may be read back by the administrative client 142. In an example, the administrative client 142 is a performance monitoring program that obtains performance data from the driver 160 and formats the data for display to a user.

Figure 3:
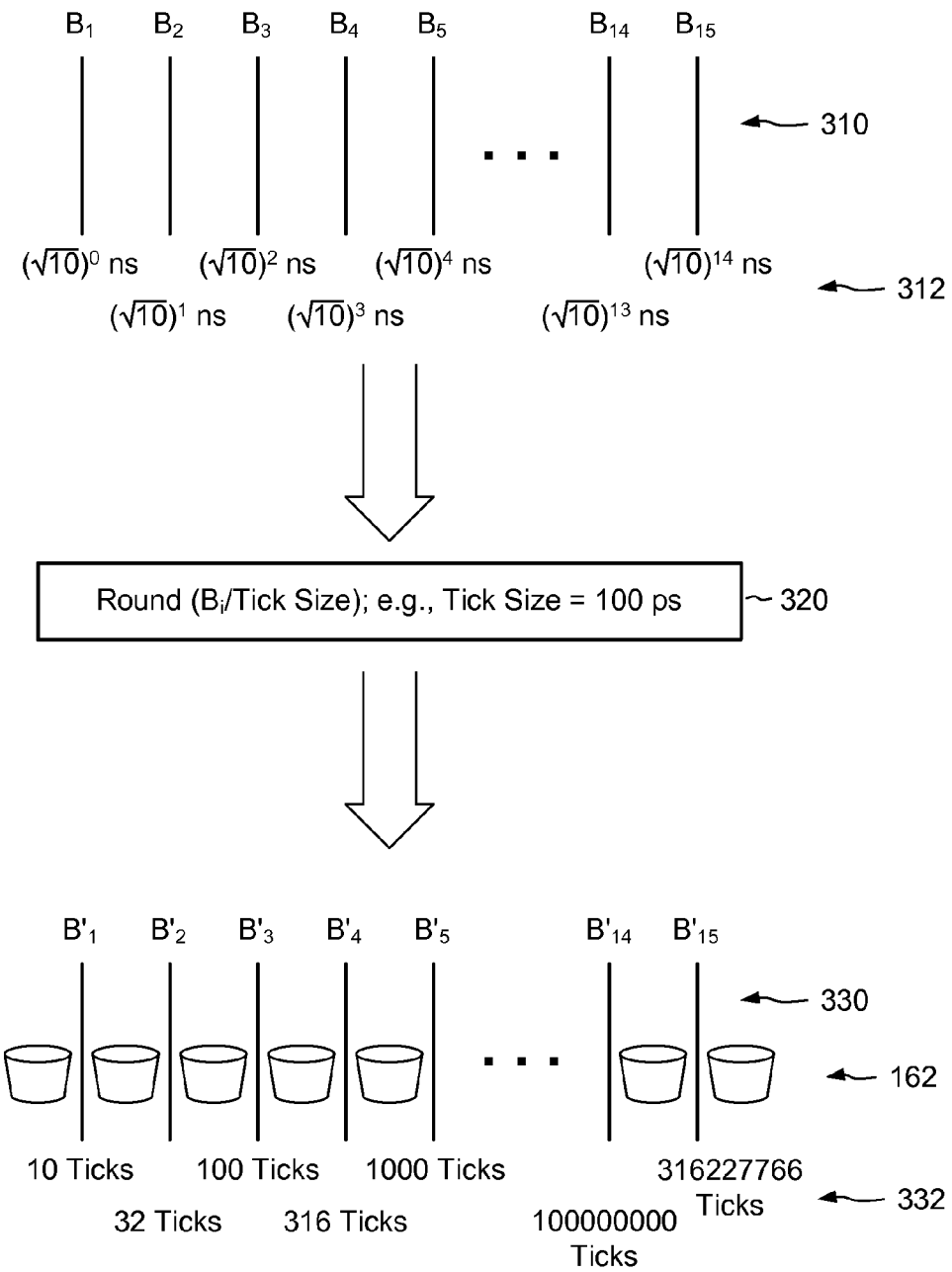
FIG. 3 is a diagram showing a conversion of a sequence of time-referenced boundaries to a corresponding sequence of tick-referenced boundaries based on an example tick size of 100 picoseconds.

FIG. 3 shows an example process flow for converting an initial sequence of time-reference data bucket boundaries 310 into a corresponding sequence of tick-referenced boundaries 330. The process flow of FIG. 3 is conducted for the case where the host 110 includes a high resolution clock 156. As shown, the sequence of time-referenced boundaries 310 are expressed as time values 312 ($B_1$-$B_{15}$). In the example shown, the time values 312 are represented in nanoseconds and increase as powers of the square root of 10. As indicated at 320, the metric manager 210 reads the tick size indicator 242 of the high resolution clock 156 and applies the tick size in computing the corresponding sequence of tick-referenced boundaries 330. In particular, a number of ticks $B'_i$ is computed by dividing a corresponding time-reference value $B_i$ by the tick size of the high resolution clock 156. The resulting quotient may be rounded to the nearest integer or truncated. In the illustrated example, the tick size of the high resolution clock is 100 picoseconds and the resulting tick-referenced boundary values are shown. It is understood that time values 312 are merely illustrative and may be varied as appropriate for the expected range of latency values to be measured. Also, the tick size will typically vary based on the specifications of the particular high resolution clock 156.

In the example shown, 15 boundaries ($B_1$-$B_{15}$) form a total of 16 data buckets 162. The bucket covering the smallest latency values ranges from 0 to $B'_1$, and the bucket covering the largest latency values is expressed simply as those greater than $B'_{15}$.

Figure 4:
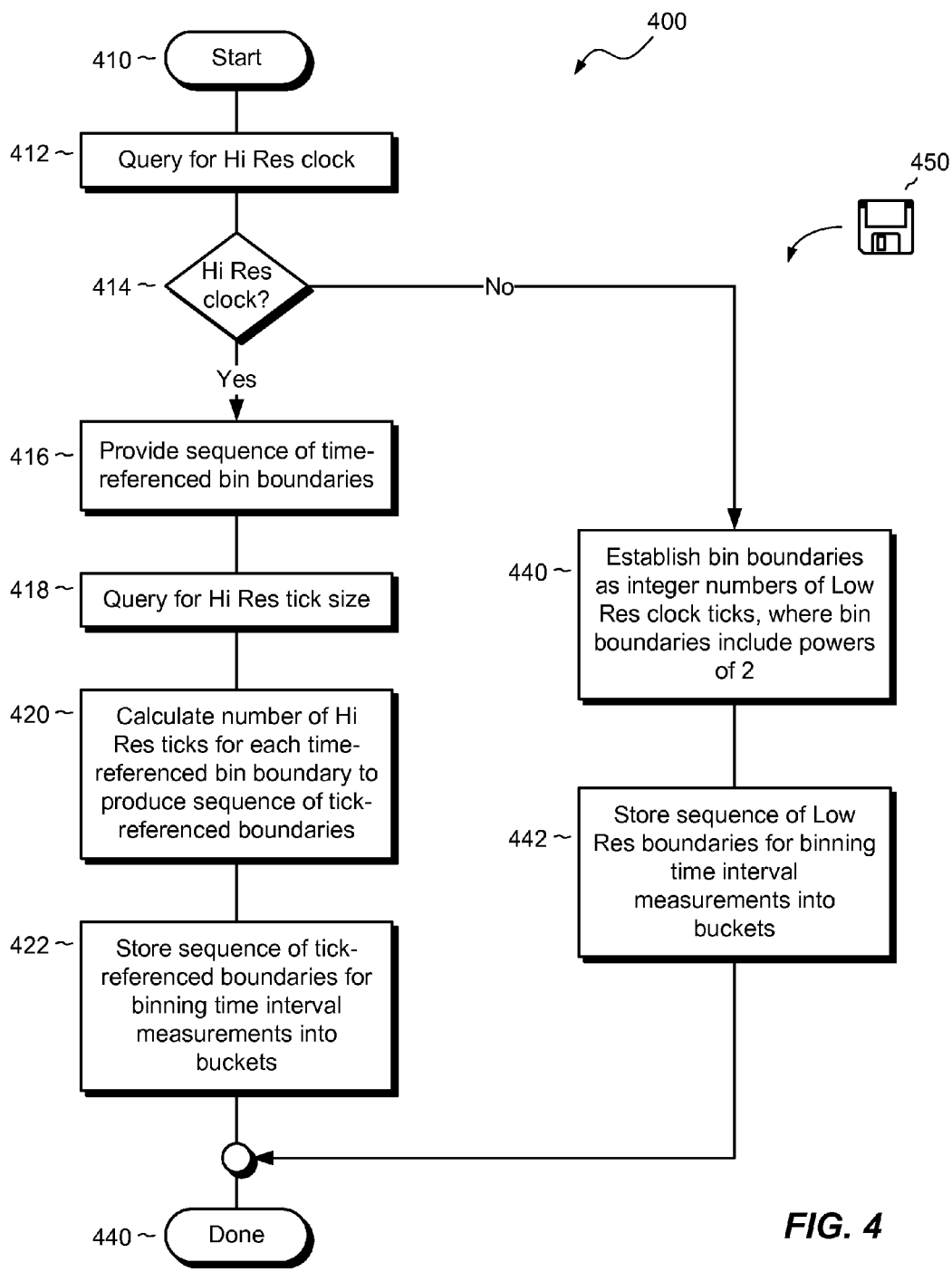
FIG. 4 is a flowchart showing an example process for establishing boundaries of I/O latency buckets both with and without a high resolution timer.
Figures 5A, 5B:
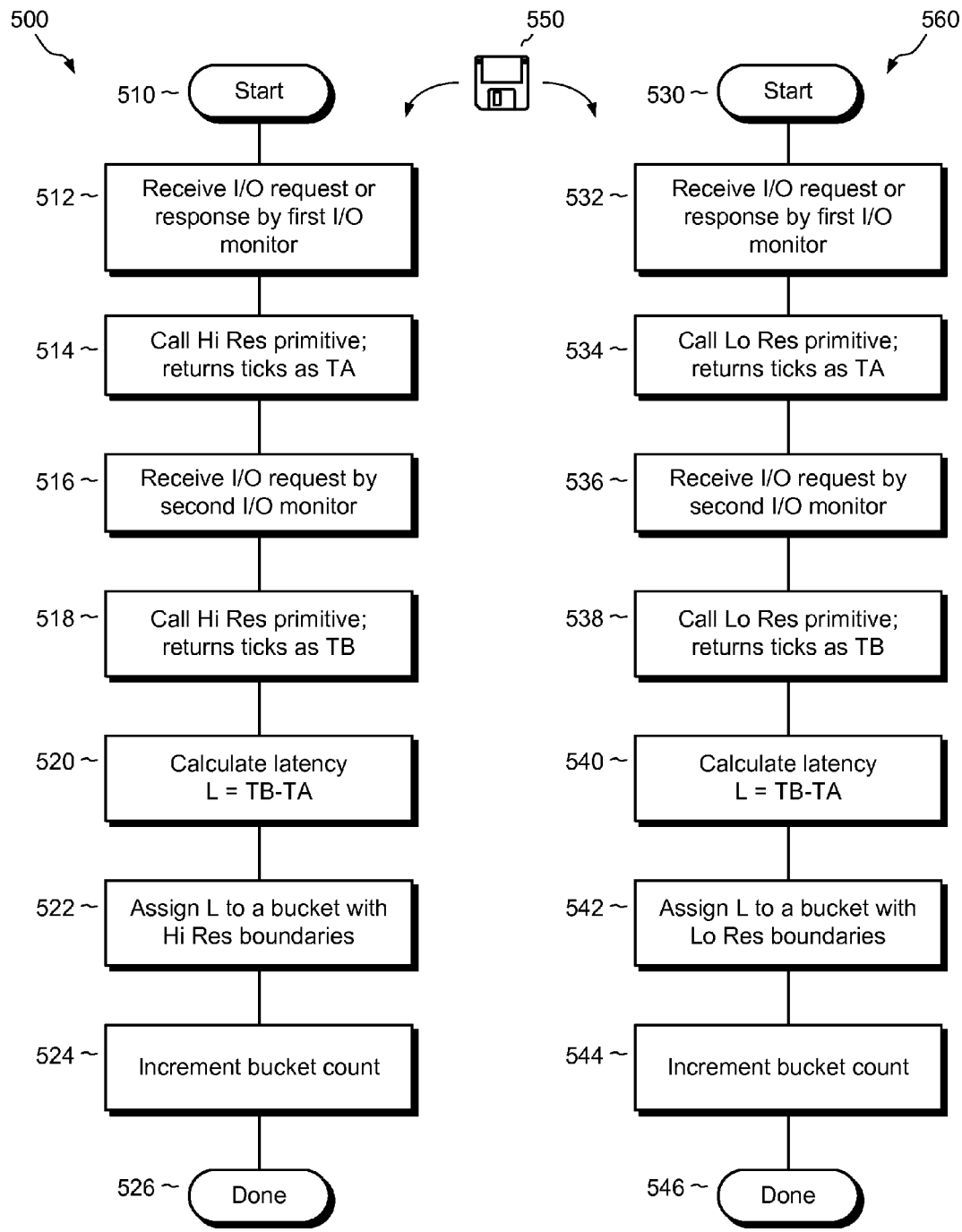
FIG. 5A shows an example process for measuring I/O request latency with I/O latency buckets established according to the process of FIG. 4 where a high resolution clock is present.
FIG. 5B shows an example process for measuring I/O request latency with I/O latency buckets established according to the process of FIG. 4 where a high resolution clock is not present.

FIGS. 4, 5A, and 5B illustrate processes that may be carried out in connection with the computing environment 100. These processes are typically performed by the driver 160 and other software constructs of the host 110, described in connection with FIGS. 1 and 2, which reside in the memory 126 of the host 110 and are run by the set of processors 116. The various acts of each process may be ordered in any suitable way. Accordingly, embodiments may be constructed in which acts are performed in orders different from those illustrated, which may include performing some acts simultaneously, even though the acts are shown as sequential in the illustrated embodiments.

FIG. 4 shows an example process 400 conducted by the multipathing driver 160 at startup, or during some other configuration phase, for establishing bucket boundaries for latency measurements to be made at runtime.

The process 400 may start at step 410. At step 412, the multipathing driver 160 queries the operating system 150 to discover whether the host 110 includes a high resolution clock 156. For example, the metric manager 210 calls one of the primitives 152 of the operating system 150 and receives a response indicating whether a high resolution clock 156 is present. If such a clock is present (step 414), the driver 160 sets the high resolution clock flag 240 and control proceeds to step 416.

At step 416, the multipathing driver 160 provides a sequence of time-referenced boundaries (e.g., boundaries 310) having time values (e.g., time values 312). These may be provided by reading a file stored in non-volatile memory on the host, by computing the values based on system parameters, or via any other suitable means.

At step 418, the multipathing driver 160 queries the operating system 150 to obtain the tick size of the high resolution clock 156. For example, the metric manager 210 calls a primitive 152 configured to acquire such information from the host 110. The tick size is then stored in the high resolution tick size indicator 242.

At step 420, the multipathing driver 160 calculates the number of high resolution ticks for each time-referenced bin boundary to produce a corresponding sequence of tick-referenced boundaries, using the technique described in reference to FIG. 3.

At step 422, the sequence of tick-referenced boundaries are stored in the metric memory 212, where they are available for binning latency measurements obtained at runtime. The process then completes at step 440.

Returning to step 414, if the host 110 does not contain a high resolution clock 156, control proceeds to step 440, where bucket boundaries are established according to a predetermined sequence of low resolution clock ticks. In an example, the values of the sequence increase in powers of two, where the first bucket represents the time between 0 and 1 tick of the low resolution clock 154. Although the tick size of the low resolution clock 154 may be known and reported (e.g., to the administrative client 142), it generally does not factor into the establishment of bin boundaries.

At step 442, the sequence of low resolution bucket boundaries is stored, e.g., in the metric memory 212, for binning latency measurements obtained during runtime. The process then completes at step 440.

FIGS. 5A and 5B show processes 500 and 560 for measuring the latency of an I/O request at runtime and assigning the measured latency value to one of the data buckets 162, both where a high resolution clock 156 is present (FIG. 5A) and where the high resolution clock 156 is absent (FIG. 5B).

The process 500 of FIG. 5A may start at step 510. At step 512, an I/O request or response (e.g., I/O request 230 or response 232) is received by a first I/O monitor (e.g., any of 220, 222, and 224).

At step 514, the I/O monitor obtains a timestamp TA (e.g., any of T0-T2), by calling one of the primitives 152, for example, which returns a current number of ticks of the high resolution clock 156.

At step 516, the I/O request, response, or a response to the I/O request, is received by a second I/O monitor (e.g., any of 222, 224, and 226).

At step 518, the I/O monitor obtains a timestamp TB (e.g., any of T1-T3), by calling one of the primitives 152, for example, which returns a current number of ticks of the high resolution clock 156.

At step 520, a latency measurement (L) is computed as the difference TB-TA, where L is expressed as a number of clock ticks.

At step 522, the latency measurement (L) is assigned to one of the data buckets 162 by identifying the data bucket whose boundaries define a range of high resolution clock ticks that includes the latency measurement (L). In an example, a matching bucket is identified by performing a binary search to match the latency value (L) with one of the data buckets 162. If desired, the latency measurement matched to the bucket is then discarded.

At step 522, the counter associated with the matching data bucket is incremented, and at step 526, the process is completed.

The process 500 may be repeated each time the multipathing driver 160 receives an I/O request.

FIG. 5B shows an analogous process 560 for measuring the latency of an I/O request at runtime and assigning the measured latency value to one of the data buckets 162, where the high resolution clock 156 is absent. Steps 530, 532, 534, 536, 538, 540, 542, 544, and 546 are similar to respective steps 510, 512, 514, 516, 518, 520, 522, 524, and 526 of FIG. 5A, except that the primitive(s) for returning the timestamps TA and TB at steps 534 and 538 access the low resolution clock 154 and the latency measurement computed at step 540 is assigned, at step 542, to a data bucket defined by a fixed sequence of clock ticks of the low resolution clock 154.

Once measurements have been obtained, via the process of FIG. 5A or that of FIG. 5B, results may be provided to the administrative client 142. Accumulated counter values of the buckets 162 are provided, as well as the tick size of the clock used to make the latency measurements. Where a high resolution clock 156 is present, the tick size provided is the value stored in the high resolution tick size indicator 242. Where no high resolution clock 156 is provided, the tick size provided is that of the low resolution clock 154. In keeping with the desire to avoid computationally intensive arithmetic, tick sizes are preferably provided in the form of fractions each having an integer numerator and an integer denominator. For example, a tick size of 1 nanosecond may be expressed as the fraction 1/1, whereas a tick size corresponding to a frequency of 6 gigahertz may be expressed as the fraction ⅙. Division operations and floating point arithmetic are thereby avoided.

An improved technique has been described for measuring I/O latency in an I/O driver 160 of a host computing system 110. The technique includes obtaining the tick size of a high resolution clock 156 of the host 110 and setting the boundaries 330 of I/O latency buckets 162 at different calculated numbers 332 of high resolution clock ticks. The boundaries 330 of the I/O latency buckets 162 are expressed as numbers of high resolution clock ticks and correspond to a sequence of predetermined time values 312. At runtime, the I/O driver 160 measures the latency of I/O requests using timestamps obtained from the high resolution clock 156. The latency measurements are expressed as numbers of elapsed ticks. The I/O driver 160 then assigns measured latency values to data buckets 162 by comparing ticks to ticks, without the need for unit conversion or resource-intensive arithmetic. The improved technique thus addresses the need for higher resolution in measuring I/O request latency. In doing so, the improved technique also addresses the variability of encountering different clocks on different systems, as well as the need for maintaining computational efficiency within the kernel.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments.

Having described certain embodiments, numerous alternative embodiments or variations can be made. For example, improved techniques have been shown and described with reference to a multipathing driver 160. However, these techniques may be used with any type of I/O driver, whether it supports multipathing or not.

Also, while the above-described techniques have been shown and described with reference to latency measurements, this is merely an example. The techniques described may be applied to any time measurements, whether they be related to I/O latency or other delays or occurrences.

Also, it has been shown and described that the multipathing driver 160 queries the operating system 150 at startup, or during some other setup phase, for the existence of a high resolution clock 156. Alternatively, however, the presence or absence of the high resolution clock 156 is determined even earlier, such as when software embodying the above-described techniques is built. In some examples, whether or not a system has a high resolution clock 156 is based upon the identity of the operating system 150. Certain operating systems provide high resolution clocks, whereas others do not. In these examples, the value of the high resolution flag 240 can be established when the software is built.

Further, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as media 450 and 550 in FIGS. 4, 5A, and 5B). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Those skilled in the art will therefore understand that various changes in form and detail may be made to the embodiments disclosed herein without departing from the scope of the invention.

What is claimed is:

1. A method operable by an I/O driver of a host computing system, comprising:
providing a sequence of time-referenced boundaries for binning time interval measurements made by the I/O driver;
querying an operating system of the host computing system to obtain a tick size of a clock of the host computing system, the tick size indicating the duration between successive ticks of the clock; and for each of the sequence of time-referenced boundaries, calculating a number of ticks of the clock that fit into the time-referenced boundary by dividing the time-referenced boundary by the tick size obtained when querying the operating system, so as to produce a sequence of tick-referenced boundaries each expressed as a number of ticks of the clock, wherein each consecutive pair of tick-referenced boundaries forms a data bucket having a range extending from a lower boundary to an upper boundary of the pair of tick-referenced boundaries.

2. The method of claim 1, further comprising:

measuring time intervals by the I/O driver, wherein each time interval is expressed as a number of elapsed ticks of the clock;

for each measured time interval, comparing the number of elapsed ticks of the clock with the sequence of tick-referenced boundaries to identify a matching data bucket having a range that includes the number of elapsed ticks of the clock in the measured time interval, and incrementing a counter provided in connection with the matching data bucket.

3. The method of claim 2, wherein comparing the number of elapsed ticks of the clock for a measured time interval with the sequence of tick-referenced boundaries includes performing a binary search of the number of elapsed ticks against the sequence of tick-referenced boundaries to identify the matching data bucket.

4. The method of claim 2, wherein measuring time intervals includes, for each time interval, obtaining a first count of ticks from the clock in response to a first occurrence in the I/O driver;

obtaining a second count of ticks from the clock in response to a second occurrence in the I/O driver; and subtracting the first count from the second count to produce an elapsed count representing the elapsed time between the first occurrence and the second occurrence.

5. The method of claim 4, wherein the elapsed count and each of the sequence of tick interval boundaries is maintained in the I/O driver as an integer.

6. The method of claim 5, further comprising conveying the tick size of the clock from the I/O driver to a client application.

7. The method of claim 6, wherein conveying the tick size includes expressing the tick size in fractional form with a numerator and a denominator.

8. The method of claim 5, wherein the sequence of time interval boundaries defines a series of exponentially increasing time intervals, and wherein the sequence of tick interval boundaries includes a series of exponentially increasing integers.

9. The method of claim 8, wherein the sequence of time interval boundaries are provided in numbers of nanoseconds, wherein the numbers of nanoseconds in the sequence are increasing powers of the square root of ten.

10. A computing device, comprising:

a set of processors; and memory, coupled to the set of processors, the memory storing instructions executable by the set of processors, including instructions for realizing an I/O driver, wherein the set of processors executing instructions from the memory forms a specialized circuit constructed and arranged to:

provide a sequence of time-referenced boundaries for binning time interval measurements made by the I/O driver;

query an operating system of the computing device to obtain a tick size of a clock of the computing device, the tick size indicating the duration between successive ticks of the clock; and for each of the sequence of time-referenced boundaries, calculate a number of ticks of the clock that fit into the time-referenced boundary, so as to produce a sequence of tick-referenced boundaries each expressed as a number of ticks of the clock, wherein each consecutive pair of tick-referenced boundaries forms a data bucket having a range extending from a lower boundary to an upper boundary of the pair of tick-referenced boundaries, and wherein the specialized circuit is further constructed and arranged to:

query the operating system of the computing device for a response that indicates whether the computing device includes a high resolution clock; and when the response indicates that the computing device does not include a high resolution clock, establish a sequence of low resolution boundaries for binning time interval measurements, wherein the sequence of low resolution boundaries includes a boundary representing a single tick of the low resolution clock.

11. The computing device of claim 10, wherein, when establishing the sequence of low resolution boundaries, the specialized circuit is constructed and arranged to assign one of the sequence of low resolution boundaries to be zero ticks of the low resolution clock.

12. The computing device of claim 10, wherein, when establishing the sequence of low resolution boundaries, the specialized circuit is constructed and arranged to assign the sequence of low resolution boundaries to values that include a sequence of exponentially increasing integer numbers of ticks of the low resolution clock.

13. The computing device of claim 12, wherein different ones of the low resolution boundaries are established at powers of two numbers of the low resolution clock ticks.

14. The computing system of claim 10, wherein the computing device includes both a high resolution clock and a low resolution clock, and wherein the specialized circuit is further constructed and arranged to receive a selection from a client application to use either the high resolution clock or the low resolution clock for making time interval measurements.

15. A non-transitory computer readable medium including instructions which, when executed by a set of processors of a computing device, cause the set of processors to perform a method operable by an I/O driver of a host computing system, the method comprising:

providing a sequence of time-referenced boundaries for binning time interval measurements made by the I/O driver;

querying an operating system of the host computing system to obtain a tick size of a clock of the host computing system, the tick size indicating the duration between successive ticks of the clock; and for each of the sequence of time-referenced boundaries, calculating a number of ticks of the clock that fit into the time-referenced boundary, so as to produce a sequence of tick-referenced boundaries each expressed as a number of ticks of the clock, wherein each consecutive pair of tick-referenced boundaries forms a data bucket having a range extending from a lower boundary to an upper boundary of the pair of tick-referenced boundaries, and wherein the method further comprises:

measuring time intervals by the I/O driver, wherein each time interval is expressed as a number of elapsed ticks of the clock; and for each measured time interval, comparing the number of elapsed ticks of the clock with the sequence of tick-referenced boundaries to identify a matching data bucket having a range that includes the number of elapsed ticks of the clock in the time interval, and incrementing a counter provided in connection with the matching data bucket.

16. The non-transitory computer readable medium of claim 15, wherein measuring time intervals includes, for each time interval, obtaining a first count of ticks from the clock in response to a first occurrence in the I/O driver;

obtaining a second count of ticks from the clock in response to a second occurrence in the I/O driver; and subtracting the first count from the second count to produce an elapsed count of ticks representing the elapsed time between the first occurrence and the second occurrence.

17. The non-transitory computer readable medium of claim 16, wherein the elapsed count of ticks and each of the sequence of tick interval boundaries is maintained within the I/O driver as an integer.

18. The non-transitory computer readable medium of claim 17, wherein the predetermined sequence of time interval boundaries defines a series of exponentially increasing time intervals, and wherein the sequence of tick interval boundaries includes a series of exponentially increasing integers.

19. The non-transitory computer readable medium of claim 15, wherein comparing the number of elapsed ticks of the clock for a measured time interval with the sequence of tick-referenced boundaries includes performing a binary search of the number of elapsed ticks against the sequence of tick-referenced boundaries to identify the matching data bucket.

20. The non-transitory computer readable medium of claim 15, wherein the method further comprises conveying the tick size of the clock from the I/O driver to a client application, wherein conveying the tick size includes expressing the tick size in fractional form with a numerator and a denominator.

* * * * *